US011206067B2

(12) United States Patent
Takahashi

(10) Patent No.: US 11,206,067 B2
(45) Date of Patent: Dec. 21, 2021

(54) ANTENNA SYSTEM, CONTROL METHOD OF ANTENNA SYSTEM, STORAGE MEDIUM, WIRELESS COMMUNICATION APPARATUS AND SYSTEM

(71) Applicant: NEC CORPORATION, Tokyo (JP)

(72) Inventor: Yoshihide Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/042,344

(22) PCT Filed: Feb. 18, 2019

(86) PCT No.: PCT/JP2019/005830
§ 371 (c)(1),
(2) Date: Sep. 28, 2020

(87) PCT Pub. No.: WO2019/187769
PCT Pub. Date: Oct. 3, 2019

(65) Prior Publication Data
US 2021/0028838 A1 Jan. 28, 2021

(30) Foreign Application Priority Data
Mar. 29, 2018 (JP) .............................. JP2018-063609

(51) Int. Cl.
*H04B 7/02* (2018.01)
*H04B 7/06* (2006.01)
*H04B 17/318* (2015.01)

(52) U.S. Cl.
CPC ......... *H04B 7/0608* (2013.01); *H04B 17/318* (2015.01)

(58) Field of Classification Search
CPC ........ H04B 17/12; H04B 5/02; H04B 17/102; H04B 17/318; H04B 1/04; H04B 1/0483; H04B 1/44; H04B 7/0608
See application file for complete search history.

(56) References Cited

U.S. PATENT DOCUMENTS

| 2005/0201482 A1* | 9/2005 | Iwasaki | H04B 7/0857 375/267 |
| 2009/0315774 A1* | 12/2009 | Son | H01Q 3/267 342/372 |

FOREIGN PATENT DOCUMENTS

| JP | 09-205391 A | 8/1997 |
| JP | 2010-068174 A | 3/2010 |

(Continued)

OTHER PUBLICATIONS

International Search Report of PCT/JP2019/005830 dated Mar. 26, 2019 [PCT/ISA/210].

*Primary Examiner* — Nhan T Le
(74) *Attorney, Agent, or Firm* — Sughrue Mion, PLLC

(57) ABSTRACT

An object is to provide an antenna system, a control method of an antenna system, and program capable of maintaining communication quality even when communication state between wireless communication apparatuses is changed. Detection antennas are arranged in a Z-direction to respectively correspond to radiation antennas and receive radio waves. A combiner/divider circuit (13) distributes a transmission signal to the radiation antennas. A detection circuit detects reception sensitivity distribution of the detection antennas in the Z-direction. A control circuit controls the combiner/divider circuit based on the reception sensitivity distribution to cause the radiation antennas corresponding to the detection antenna having reception sensitivity higher than a predetermined value to radiate the radio wave.

9 Claims, 13 Drawing Sheets

(56) References Cited

FOREIGN PATENT DOCUMENTS

| JP | 2014-147060 A | 8/2014 |
|----|---------------|--------|
| JP | 2015-142290 A | 8/2015 |

\* cited by examiner

ANTENNA SYSTEM, CONTROL METHOD OF ANTENNA SYSTEM, STORAGE MEDIUM, WIRELESS COMMUNICATION APPARATUS AND SYSTEM

CROSS REFERENCE TO RELATED APPLICATIONS

This application is a National Stage of International Application No. PCT/JP2019/005830, filed Feb. 18, 2019, claiming priority to Japanese Patent Application No. 2018-063609, filed Mar. 29, 2018, the contents of all of which are incorporated herein by reference in their entirety.

TECHNICAL FIELD

The present invention relates to an antenna system, a control method of an antenna system, storage medium, a wireless communication apparatus and system.

BACKGROUND ART

In the wireless communication between two points, the communication state changes due to the influence of the environment between the two points. Therefore, it is required to maintain a predetermined communication quality even when the communication state changes.

To maintain the communication quality even when the communication state changes, a wireless communication system that selects a directional antenna to be used according to reception sensitivity has been proposed (Patent Literature 1). The wireless communication system includes a plurality of directional antennas that are oriented in different directions and the reception sensitivity of each directional antenna is monitored. Thus, it is possible to communicate corresponding to the direction of the communication partner can be performed by using the directional antenna having the highest reception sensitivity.

CITATION LIST

Patent Literature

[Patent Literature 1] Japanese Unexamined Patent Application Publication No. 2014-147060

SUMMARY OF INVENTION

Technical Problem

In the wireless communication, for example, it is known that a reflected wave from the ground reaches the antenna as an interference wave to affect the reception state. Further, when using a wireless communication apparatus while moving in an urban area, reflections due to buildings and vehicles become prominent, and the communication state greatly varies. In this case, a height pattern indicating the relation between the heights at which the antennas are disposed and the electric field strength of a radio wave reaching the antennas varies, and the communication quality is affected.

FIG. 13 illustrates a relation between a distance between two wireless communication apparatuses and reception sensitivity of the radio wave received by one reception-side wireless communication apparatus. Here, the power value [dBm] of the received radio wave is used as the reception sensitivity. As illustrated in FIG. 13, it can be understood that the height at which the electric field strength becomes maximum varies as the distance between the wireless communication apparatuses varies.

In contrast, since it is impossible to correspond to the variation of the height pattern even when the direction of the directional antenna is changed as in Patent Literature 1, the communication quality cannot be maintained.

When the height pattern is fixed, it is possible to maximize the electric field strength by adjusting the height at which the antenna is disposed or simultaneously using a plurality of antennas separately disposed in a height direction (so-called space diversity). However, since positions at which the antennas are disposed and separation distances of the antennas are fixed, it is impossible to follow the variation of the height pattern as described above.

The present invention has been made in view of the above-mentioned problem, and an object of the present invention is to provide an antenna system, a control method of an antenna system, and program capable of maintaining communication quality even when communication state between wireless communication apparatuses is changed.

Solution to Problem

An aspect of the present invention is an antenna system including: a plurality of radiation antennas arranged in a first direction, each radiation antenna being configured to radiate a radio wave; a plurality of detection antennas arranged in the first direction to respectively correspond to the radiation antennas, each detection antenna being configured to receive a radio wave, the detection antennas being arranged in the first direction to correspond to the radiation antennas, respectively; a combiner/divider unit configured to distribute an input transmission signal to the radiation antennas; a detection unit configured to detect reception sensitivity distribution of the detection antennas in the first direction; and a control unit configured to control the combiner/divider unit based on the reception sensitivity distribution to cause the radiation antennas corresponding to the detection antenna having reception sensitivity higher than a predetermined value to radiate the radio wave.

An aspect of the present invention is a control method of an antenna system including: detecting reception sensitivity of radio waves received by a plurality of detection antennas arranged in a first direction to correspond to a plurality of radiation antennas configured to radiate radio waves in response to a transmission signal, respectively; and controlling a combiner/divider unit distributing the transmission signal to the radiation signal based on the reception sensitivity distribution to cause the radiation antennas corresponding to the detection antenna having reception sensitivity higher than a predetermined value to radiate the radio waves.

A control program causing to a computer to execute processes of: detecting reception sensitivity of radio waves received by a plurality of detection antennas arranged in a first direction to correspond to a plurality of radiation antennas configured to radiate radio waves in response to a transmission signal, respectively; and controlling a combiner/divider unit distributing the transmission signal to the radiation signal based on the reception sensitivity distribution to cause the radiation antennas corresponding to the detection antenna having reception sensitivity higher than a predetermined value to radiate the radio waves.

Advantageous Effects of Invention

According to the present invention, it is possible to provide an antenna system, a control method of an antenna system, and program capable of maintaining communication quality even when communication state between wireless communication apparatuses is changed.

DESCRIPTION OF EMBODIMENTS

Figure 1:
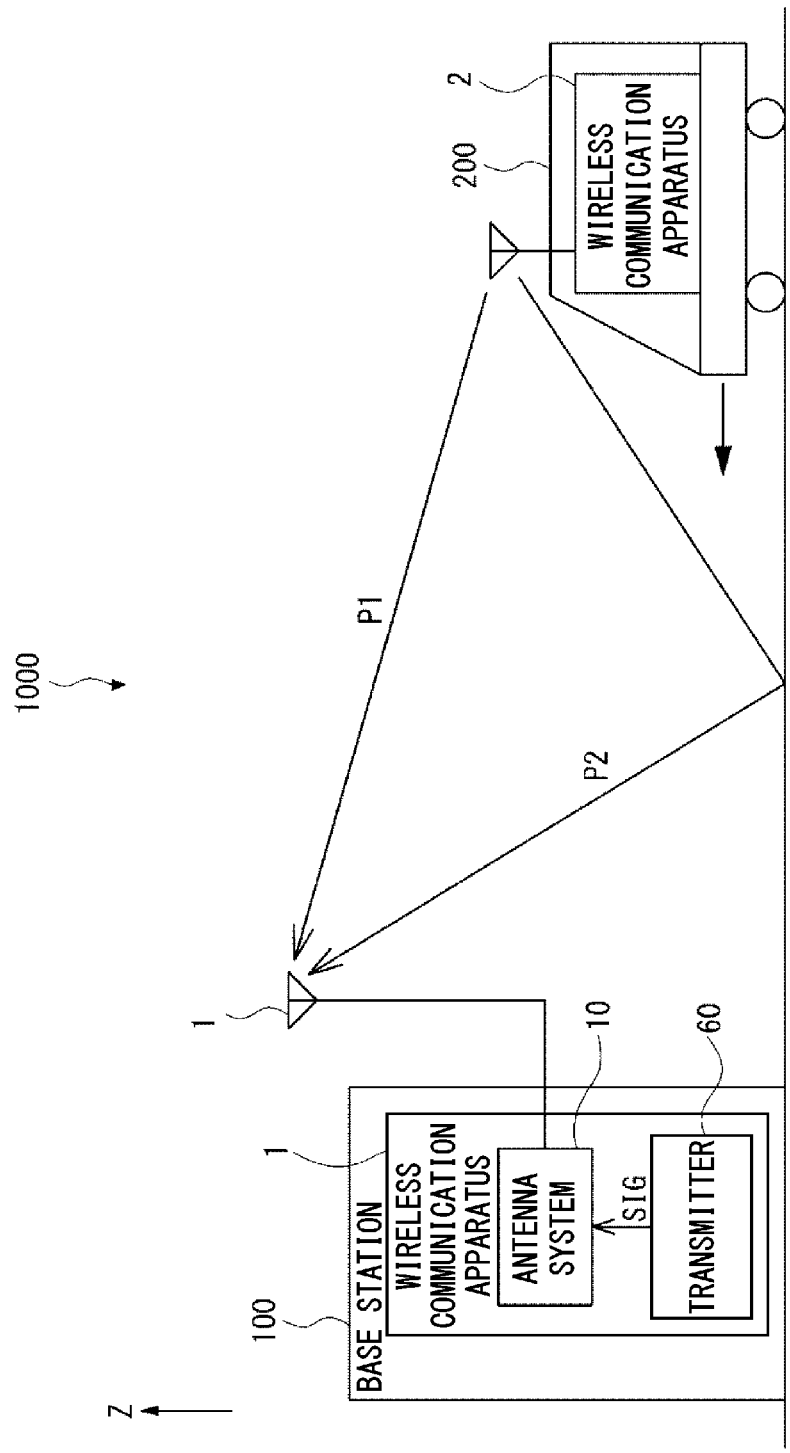
FIG. 1 schematically illustrates a configuration of a wireless communication system according to a first example embodiment.

Example embodiments of the present invention will be described below with reference to the drawings. In the drawings, the same elements are denoted by the same reference numerals, and thus a repeated description is omitted as needed.

First Example Embodiment

Example embodiments of the present invention will be described below with reference to the drawings. FIG. 1 schematically illustrates a configuration of a wireless communication system 1000 according to a first example embodiment. The wireless communication system 1000 transmits and receives a radio wave between a wireless communication apparatus 1 and a wireless communication apparatus 2. In the present example embodiment, it is assumed that one or both of the wireless communication apparatus 1 and the wireless communication apparatus 2 move and positions thereof change. In this example, the wireless communication apparatus 1 is installed in a base station 100 that is a fixed station, and the wireless communication apparatus 2 is installed in a movable vehicle 200.

The wireless communication apparatus 1 will be described. The wireless communication apparatus 1 includes an antenna system 10 and a transmitter 60. The transmitter 60 outputs a transmission signal SIG to the antenna system 10 and the antenna system 10 radiates a radio wave in response to the transmission signal SIG to communicate with the wireless communication apparatus 2.

Figure 2:
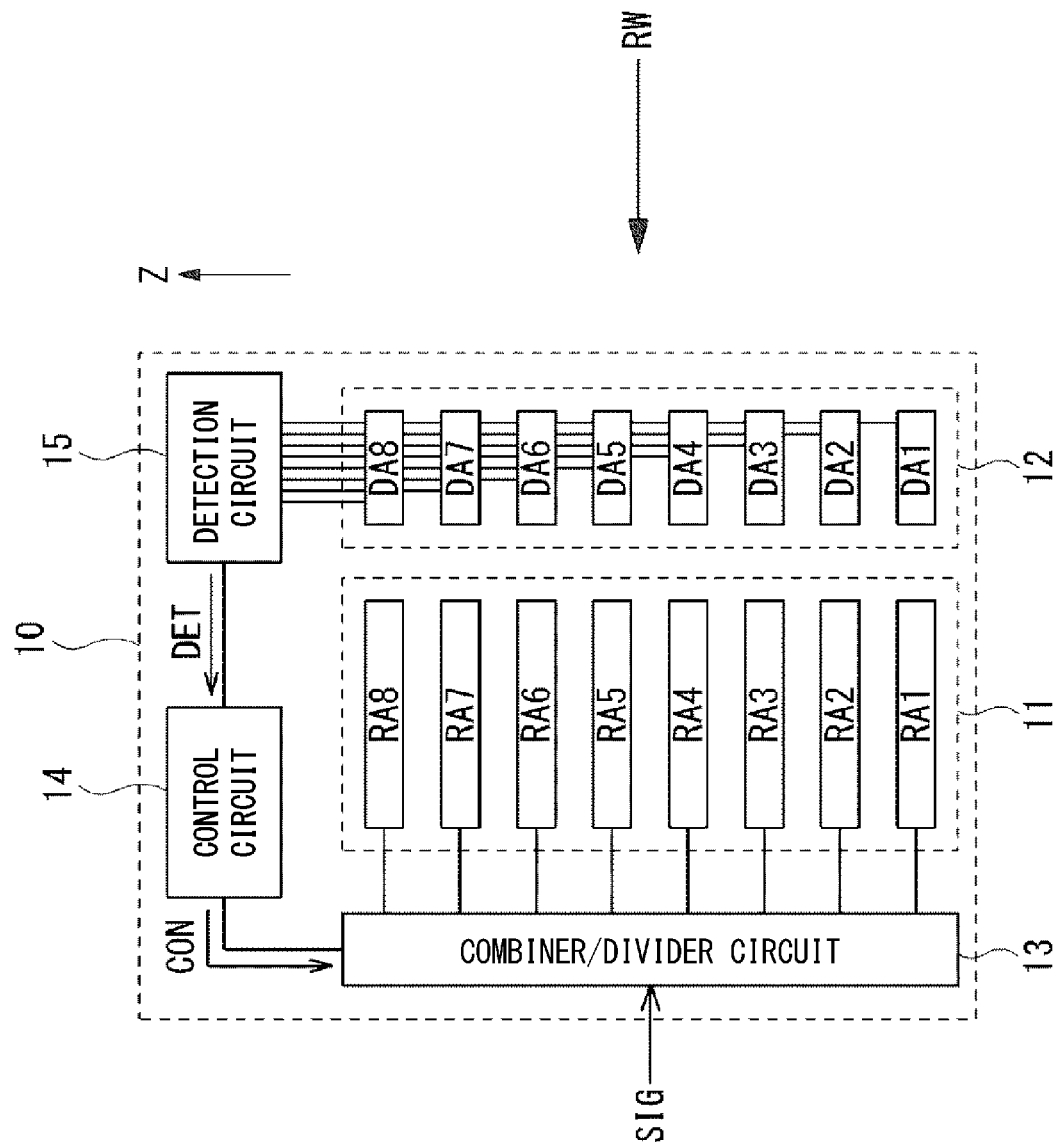
FIG. 2 schematically illustrates a configuration of an antenna system according to the first example embodiment.

FIG. 2 schematically illustrates a configuration of the antenna system 10 according to the first example embodiment. The antenna system 10 includes a radiation antenna array 11, a detection antenna array 12, a combiner/divider circuit 13, a control circuit 14, and a detection circuit 15.

Here, the combiner/divider circuit, the control circuit, and the detection circuit are also referred to as a combiner/divider unit, a control unit, and a detection unit, respectively.

The radiation antenna array 11 includes radiation antennas RA1 to RA8. The radiation antennas RA1 to RA8 are arranged side by side in a height direction, or in a Z-direction (also referred to as a first direction) normal to the ground surface. The arrangement direction of the radiation antennas RA1 to RA8 is merely an example, and they may be arranged in a direction other than the Z-direction normal to the ground surface.

The detection antenna array 12 includes detection antennas DA1 to DA8. The detection antennas DA1 to DA8 are arranged side by side in the height direction, or in the Z-direction (First direction). The detection antennas DA1 to DA8 are disposed at the same levels as the radiation antennas RA1 to RA8 or at levels approximate thereto, respectively.

The detection circuit 15 is configured to be capable of detecting a radio wave reception sensitivity of each of the detection antennas DA1 to DA8. For example, the detection circuit 15 may detect power or electric field intensity of the radio wave received by each of the detection antennas DA1 to DA8 as the reception sensitivity. The detection circuit 15 outputs the detection result of the radio wave reception sensitivity to the control circuit 14 as a detection signal DET. The detection circuit 15 detects the received power or the voltage of each of the detection antennas DA1 to DA8, for example.

Figure 3:
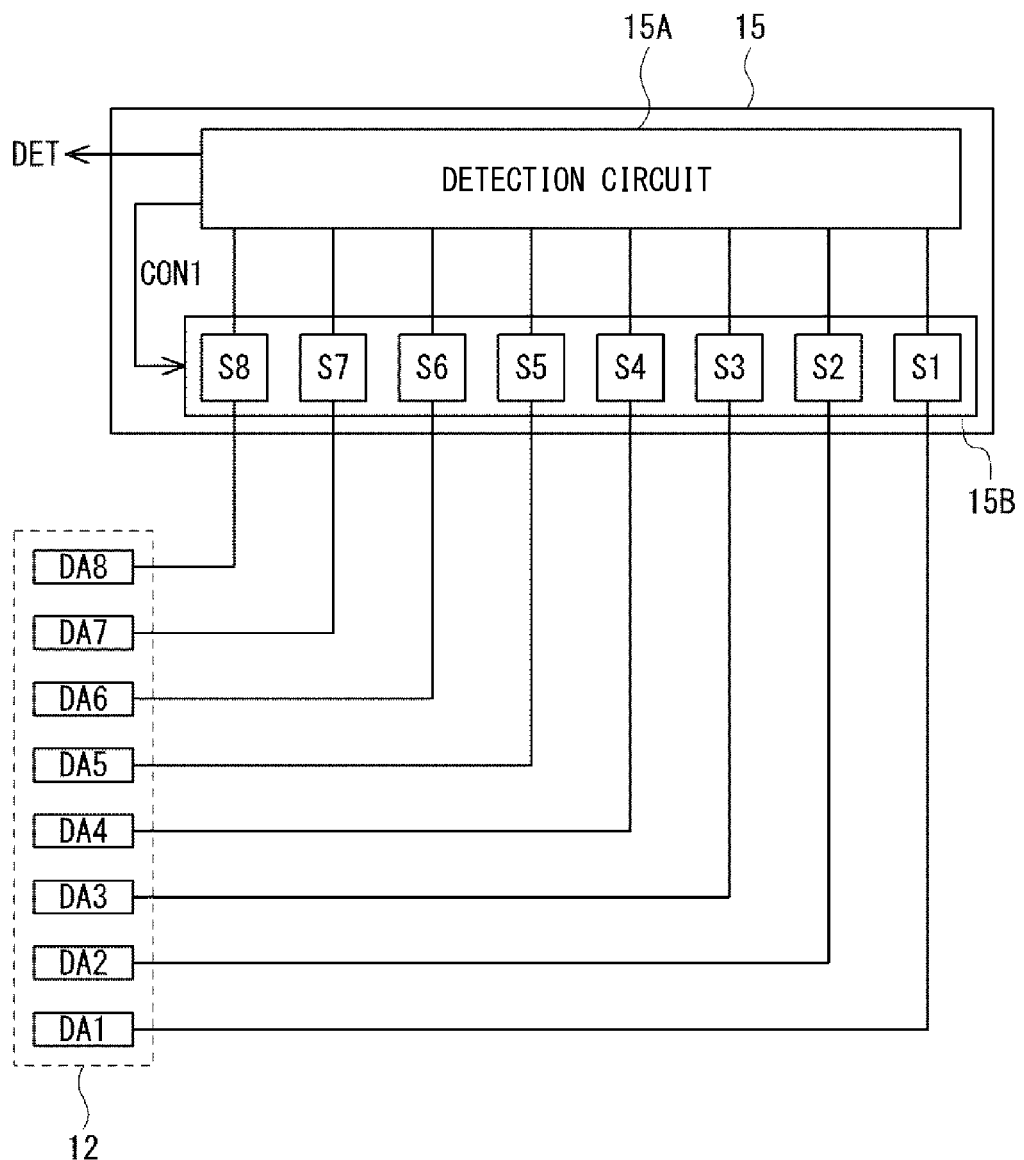
FIG. 3 schematically illustrates an example of a configuration of a detection circuit.

FIG. 3 schematically illustrates an example of a configuration of the detection circuit 15. The detection circuit 15 includes a detection circuit 15A and a switching circuit 15B. Here, the switching circuit is also referred to as a switching unit. The switching circuit 15B includes switches S1 to S8. The switches S1 to S8 are inserted between the detection antennas DA1 to DA8 and the detection circuit 15A, respectively. The detection circuit 15A controls the switches S1 to S8 by a control signal CON1 to cause any one of the switches S1 to S8 to be turned on and to cause the other switches to be turned off. By changing the switch that is turned on in sequence, the detection circuit 15A can detect the reception sensitivity of each of the detection antennas DA1 to DA8

The control circuit 14 acquires reception sensitivity distribution of the detection antennas DA1 to DA8 based on the detection signal DET and controls the combiner/divider circuit 13 by the control signal CON based on the acquired reception sensitivity distribution. As described above, since the detection antennas DA1 to DA8 are arranged in the height direction (Z-direction), it can be understood that the acquired reception sensitivity distribution becomes the height pattern of the radio wave received by the detection antenna array 12.

The combiner/divider circuit 13 is connected between the radiation antennas RA1 to RA8 and the transmitter 60. The combiner/divider circuit 13 distributes the transmission signal SIG input from the transmitter 60 to the radiation antennas RA1 to RA8 according to the control by the control circuit 14.

Figure 4:
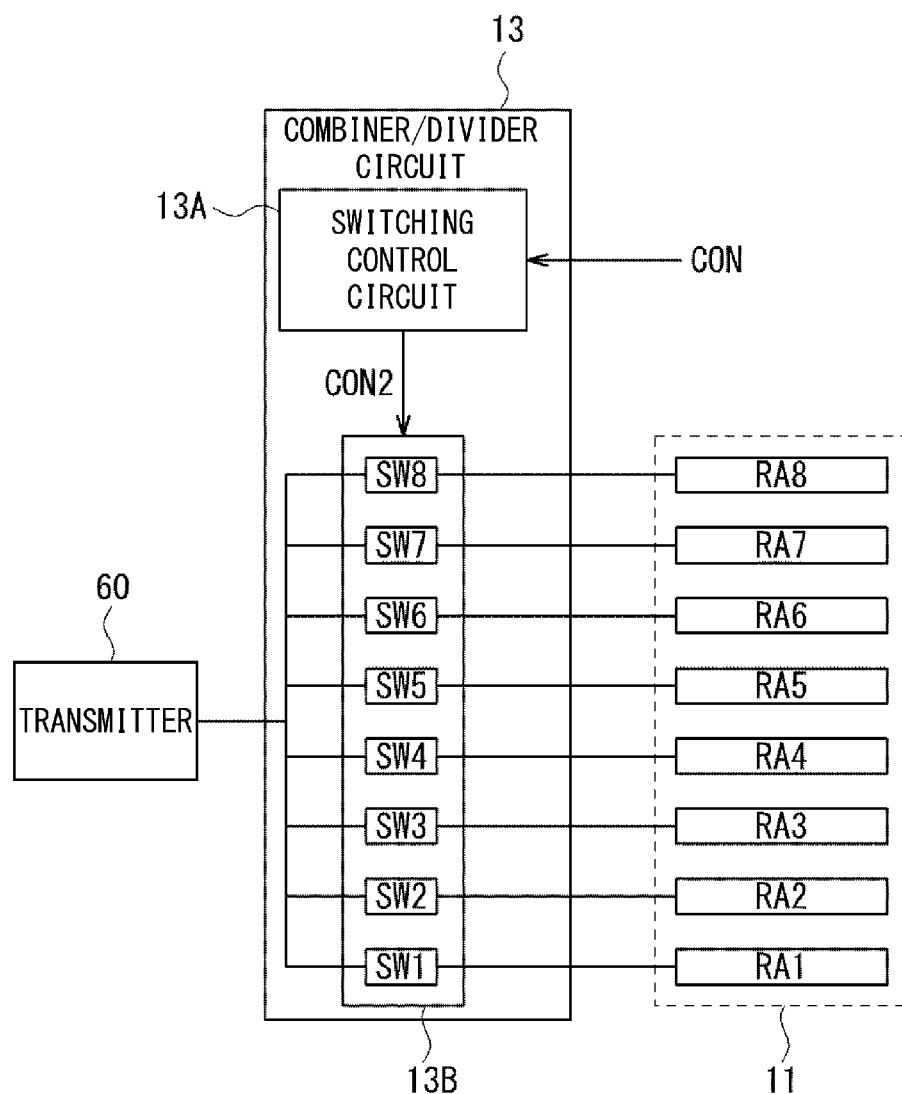
FIG. 4 illustrates a configuration example of a combiner/divider circuit and a control thereof.

FIG. 4 illustrates a configuration example of the combiner/divider circuit 13 and a control thereof. The combiner/divider circuit 13 includes a switching control circuit 13A and a switching circuit 13B. Here, the switching control circuit and the switching circuit are referred to as a switching control unit and a switching unit, respectively. The switching circuit 13B includes switches SW1 to SW8. The switches SW1 to SW8 are inserted between the transmitter 60 and the radiation antennas RA1 to RA8, respectively. The control circuit 14 provides the switching control circuit 13A with the control signal CON to specify the switch to be turned on in the switches SW1 to SW8. The switching control circuit 13A controls the switches SW1 to SW8 by a control signal CON2 to turn on only the switch specified by the control circuit 14 in the switches SW1 to SW8 and to turn off the other switches. Thus, it is possible to radiate the radio wave from the radiation antenna corresponding to the detection antenna having the excellent reception sensitivity.

Next, an operation of the antenna system 10 will be described. The wireless communication apparatus 2 transmits a radio wave RW to the wireless communication apparatus 1 in order to communicate with the wireless communication apparatus 1. Each of the detection antennas DA1 to DA8 in the detection antenna array 12 receives the radio wave RW.

The radio wave RW radiated from the wireless communication apparatus 2 reaches the detection antenna array 12 through various paths. For example, as illustrated in FIG. 1, the radio wave RW radiated from the wireless communication apparatus 2 reaches the wireless communication apparatus 1 through a path P1 and a path P2. The path P1 is a path through which the radio wave directly reaches the wireless communication apparatus 1 from the wireless communication apparatus 2. The path P2 is a path through which the radio wave radiated from the wireless communication apparatus 2 is reflected by the ground surface and then reaches the wireless communication apparatus 1. In this way, when the radio waves reach the detection antenna array 12 through the different paths, the radio waves interfere with each other and the variation of the reception sensitivity (Height pattern) occurs in the height direction (Z-direction).

The detection circuit 15 detects the reception sensitivity of the radio wave RW at each of the detection antennas DA1 to DA8 and outputs the detection result to the control circuit 14 as the detection signal DET.

The control circuit 14 acquires the reception sensitivity distribution in the height direction (Z-direction) or the height pattern based on the detection signal DET. The control circuit 14 detects the detection antenna having the reception sensitivity of the radio wave RW higher than a predetermined value in the detection antennas DA1 to DA8 based on the acquired reception sensitivity distribution. The control circuit 14 selects the radiation antenna used for radiating the radio wave from the radiation antennas having the reception sensitivity higher than the predetermined value. The control circuit 14 controls the combiner/divider circuit 13 in such a manner that the selected radiation antenna is connected to the transmitter 60 and the radiation antennas other than the selected radiation antenna are not connected to the transmitter 60.

Therefore, the radio wave can be radiated from the radiation antenna that is disposed at the same level as the detection antenna having the excellent reception sensitivity.

Generally, when the frequencies of the radio waves are the same, transmission and reception of the radio waves between two points can be performed in the same communication state regardless of the directions. Therefore, the reception of the radio wave in the wireless communication apparatus 2 can be kept in a desired state by radiating the radio wave from the radiation antenna that is disposed at the same level as the detection antenna having the excellent reception sensitivity.

The operation of the antenna system 10 will be specifically described below.

Operation Example 1

Figure 5:
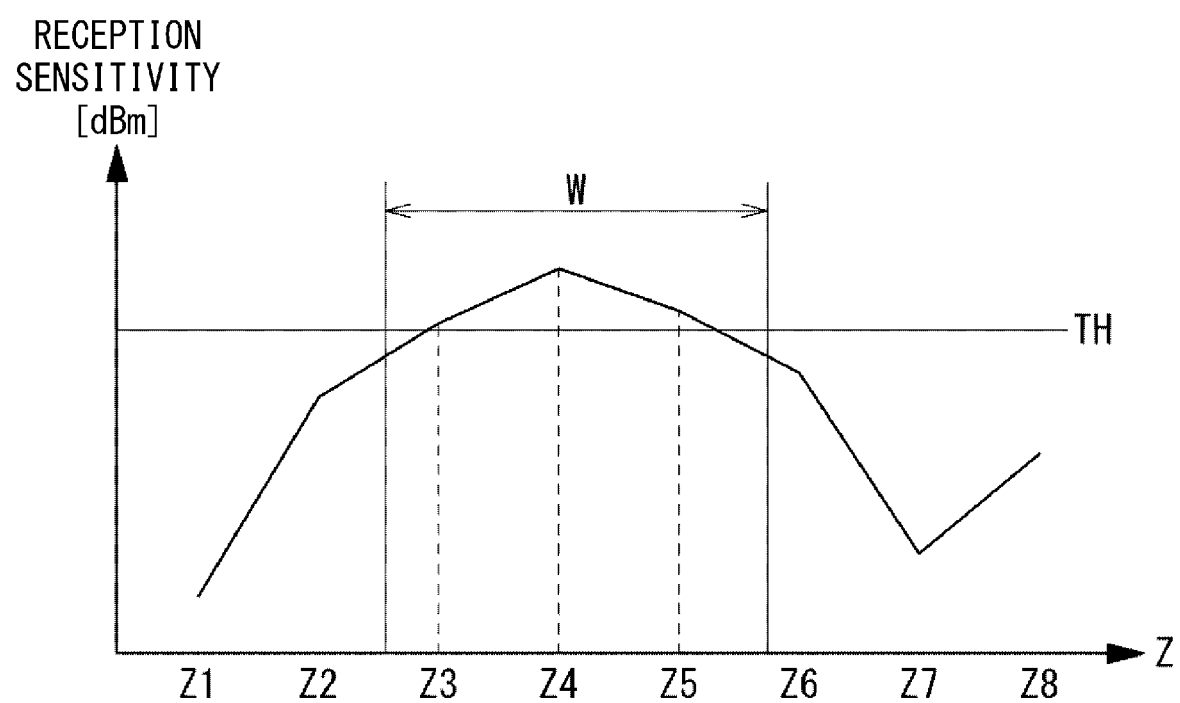
FIG. 5 illustrates reception sensitivity distribution of detection antennas.

FIG. 5 illustrates the reception sensitivity distribution of the detection antennas DA1 to DA8. In FIG. 5, the positions of the detection antennas DA1 to DA8 in the height direction (Z-direction) are Z1 to Z8. As illustrated in FIG. 5, a case in which, in the detection antennas DA1 to DA8, the reception sensitivity of each of the detection antennas DA3 to DA5 is higher than a predetermined value TH and the reception sensitivity of each of the detection antennas DA1, DA2, DA6 to DA8 is lower than the predetermined value TH will be considered. In this case, the control circuit 14 controls the combiner/divider circuit 13 to cause the radiation antennas RA3 to RA5 (also referred to as first radiation antennas) corresponding to the detection antennas DA3 to DA5 to transmit.

Note that, when the reception sensitivity of the detection antennas is the same as the predetermined value TH, it may be appropriately handled as the case in which the reception sensitivity is higher than the predetermined value TH or as the case in which the reception sensitivity is lower than the predetermined value TH.

The control circuit 14 may controls the combiner/divider circuit 13 to cause not only the radiation antennas RA3 to RA5 but also the radiation antenna RA2 (also referred to as a third radiation antenna) adjacent to the radiation antennas RA3 and the radiation antenna RA6 adjacent to the radiation antennas RA5 (also referred to as a second radiation antenna) to radiate the radio wave.

Operation Example 2

Here, a case of focusing the detection antenna having the highest reception sensitivity in the detection antennas having the reception sensitivity higher than the predetermined value TH in the detection antennas DA1 to DA8 will be described. In the example of FIG. 5, the detection antenna DA4 has the highest reception sensitivity. The control circuit 14 detects that the detection antenna DA4 has the highest reception sensitivity. In this case, the control circuit 14 controls the combiner/divider circuit 13 to cause the radiation antenna RA4 (also referred to a fourth radiation antenna) corresponding to the detection antenna DA4 to radiate the radio wave.

The control circuit 14 may control the combiner/divider circuit 13 to cause not only the radiation antenna RA4 but also the radiation antenna RA5 (also referred to as a fifth radiation antenna) above the radiation antenna RA4 and the radiation antenna RA3 (also referred to as a sixth radiation antenna) below the radiation antenna RA4.

Further, the control circuit 14 may control the combiner/divider circuit 13 to cause the radiation antenna RA6 (also referred to as the fifth radiation antenna) above the radiation antenna RA5 and the radiation antenna RA2 (also referred to as the sixth radiation antenna) below the radiation antenna RA3.

That is, the radio wave may be radiated from any number of the radiation antennas approximate to the radiation antennas corresponding to the detection antenna having the highest reception sensitivity as appropriate. In other words, as in the case of the first operation example, the radio wave may be radiated from the position higher than the radiation antenna selected to radiate the radio wave, or from at least one radiation antenna (also referred to as the fifth radiation antenna) in the Z(+)-direction (also referred to as the first direction) side. The radio wave may be radiated from the position lower than the radiation antenna selected to radiate the radio wave, or from at least one radiation antenna (also referred to as the sixth radiation antenna) in the Z(−)-direction (also referred to as the second direction) side.

Further, the control circuit 14 may determine the number of the radiation antennas used for transmission according to the acquired reception sensitivity distribution. Specifically, the control circuit 14 may control the combiner/divider circuit 13 to cause the radiation antenna corresponding to the detection antenna at the position included in the peak width (e.g. Half-value width) of the reception sensitivity to radiate the radio wave.

In the example of FIG. 5, the reception sensitivity becomes maximum at the position of the detection antenna DA4, and the positions of the detection antennas DA3 to DA5 are included in the peak width W. In this case, the control circuit 14 may control the combiner/divider circuit 13 to cause the radiation antennas RA3 to RA5 corresponding to the detection antennas DA3 to DA5 included in the peak width W of the reception sensitivity to radiate the radio wave.

Figure 6:
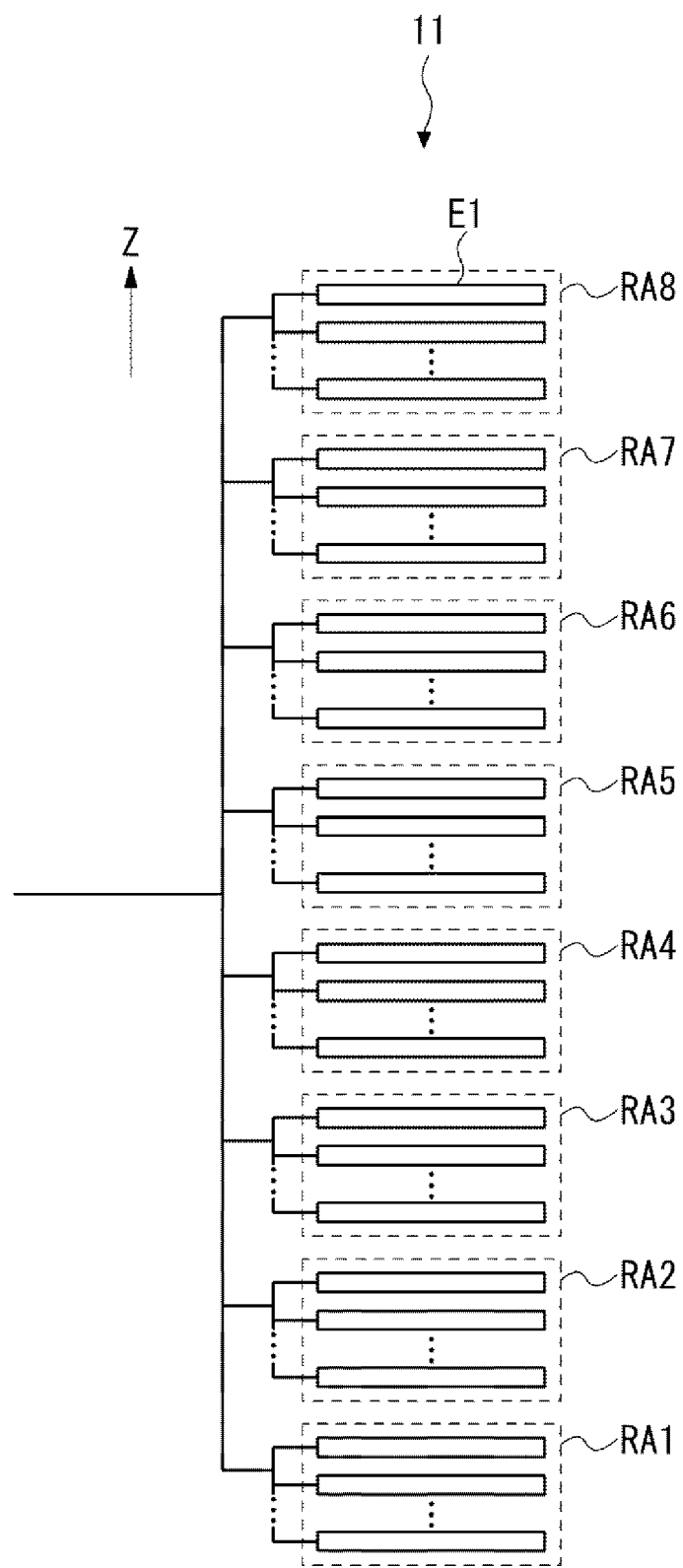
FIG. 6 illustrates an alternative example of a radiation antenna.

In the present example embodiment, each of the radiation antennas RA1 to RA8 has been described as a single antenna element, and, however, the configurations of the radiation antennas RA1 to RA8 are not limited to these. FIG. 6 illustrates an alternative example of the radiation antenna. As illustrated in FIG. 6, the radiation antennas RA1 to RA8 may be configured by a plurality of antenna elements E1 arranged in the Z-direction.

Figure 7:
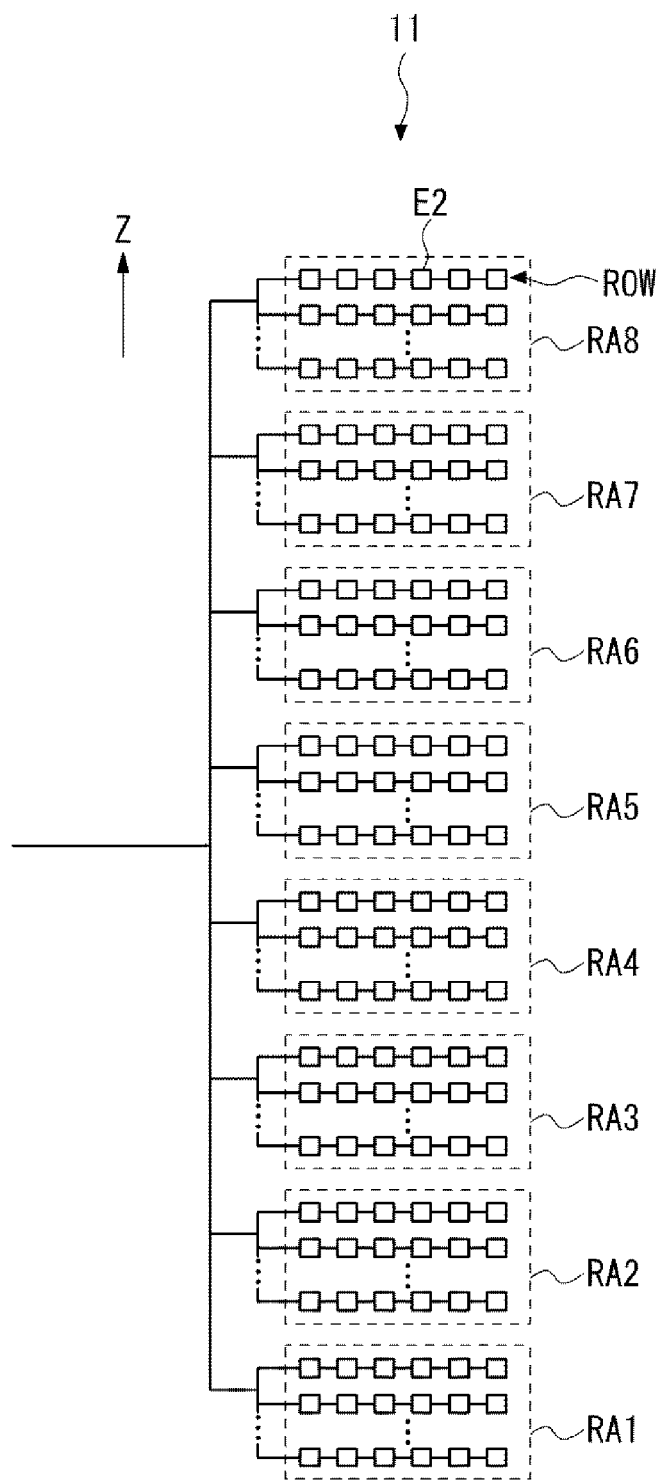
FIG. 7 illustrates another alternative example of the radiation antenna.

FIG. 7 illustrates another alternative example of the radiation antenna. As illustrated in FIG. 7, the radiation antennas RA1 to RA8 may be configured by a plurality of antenna element arrays ROW arranged in the Z-direction. Each of the antenna element array ROW may be configured by a plurality of antenna elements E2 arranged in a direction orthogonal to the Z-direction.

According to the present configuration, the detection antennas arranged in the height direction (i.e. Z-direction) can monitor the reception sensitivity distribution of the radio wave in the height direction (Height pattern). Since the radiation antenna array 11 and the detection antenna array 12 are separately disposed, the reception sensitivity can be continuously monitored using detection antenna array 12 while the radiation antenna array 11 radiates the radio wave. Thus, even when the height pattern varies as the vehicle 200 moves, it is possible to dynamically select the radiation antenna corresponding to the detection antenna having the high reception sensitivity and to radiate the radio wave therefrom. As a result, even when the positional relation between the base station 100 and the vehicle 200 varies, it is possible to maintain the high-quality communication state without disconnection.

Second Example Embodiment

Figure 8:
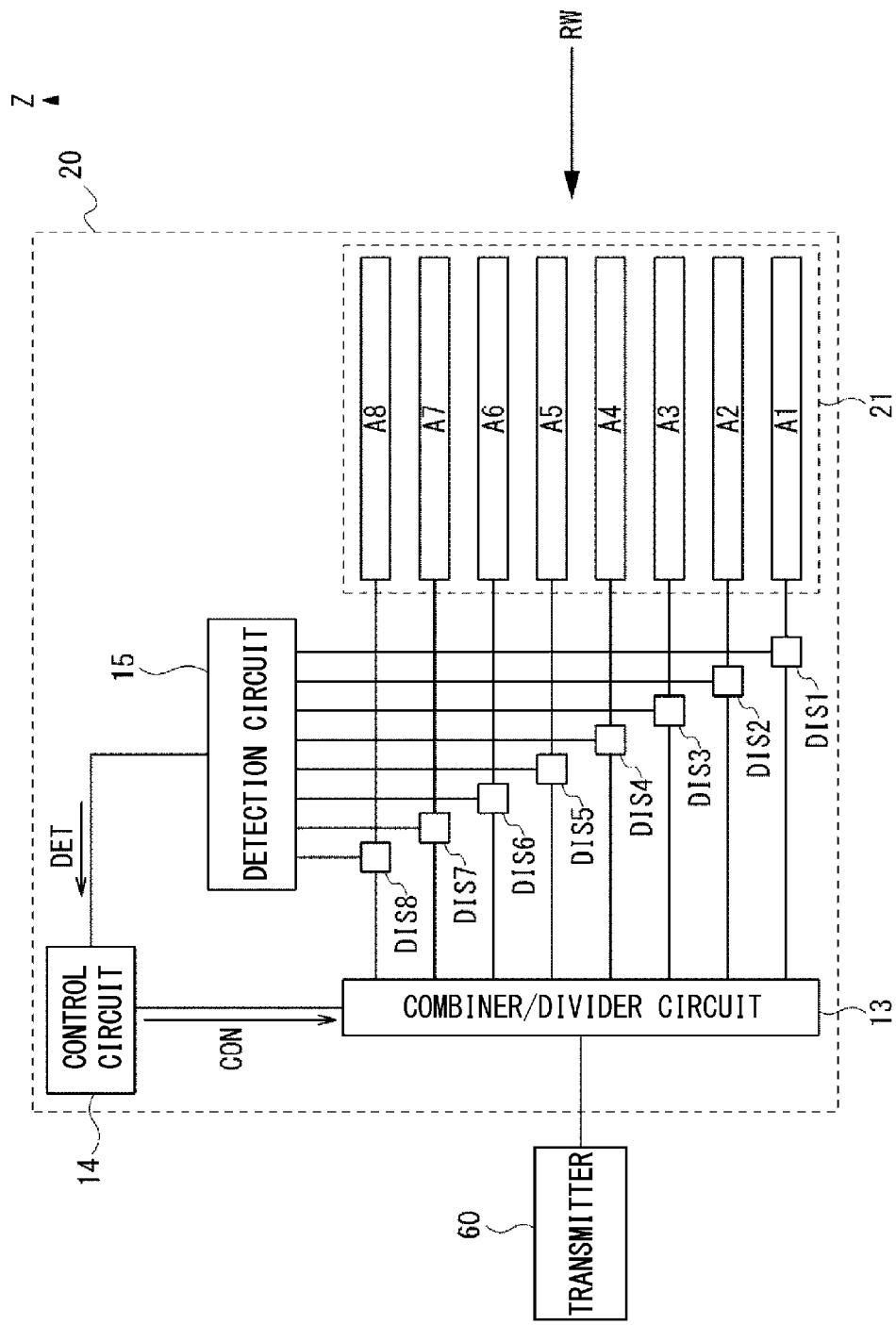
FIG. 8 schematically illustrates a configuration of an antenna system according to a second example embodiment.

An antenna system according to a second example embodiment will be described. FIG. 8 schematically illustrates a configuration of an antenna system 20 according to the second example embodiment. The antenna system 20 has a configuration in which the radiation antenna array 11 and the detection antenna array 12 in the first example embodiment are integrated as a single antenna array. The antenna system 20 has a configuration in which the radiation antenna array 11 and the detection antenna array 12 of the antenna system 10 according to the first example embodiment are replaced with an antenna array 21, and dividers DIS1 and DIS8 are added.

The antenna array 21 includes antennas A1 to A8. The dividers DIS1 and DIS8 are inserted between the antennas A1 to A8 and the combiner/divider circuit 13, respectively. The dividers DIS1 and DIS8 are directional couplers, for example. The dividers DIS1 to DIS8 pass a signal output from the transmitter 60 to the antennas A1 to A8, and pass signals received by the antennas A1 to A8 to the detection circuit 15.

According to the above configuration, as in the case of the antenna system 10, the antenna system 20 can select the antenna used for transmission in the antennas A1 to A8 based on the reception sensitivity of the antennas A1 to A8. Since the selection of the antenna used for the transmission is the same as that of the first example embodiment, the description thereof will be omitted.

It is desirable to detect the reception sensitivity of the antennas A1 to A8 when the radio waves are not radiated from the antennas A1 to A8. That is, it is desirable to stop radiating the radio wave during the detection of the reception sensitivity. Thus, the reception sensitivity of the antennas A1 to A8 can be precisely monitored.

According to the present configuration, since the radiation antenna and the detection antenna can be integrated, the number of the antenna elements can be decreased as compared with the antenna system 10. As a result, the antenna system can be miniaturized.

Third Example Embodiment

Figure 9:
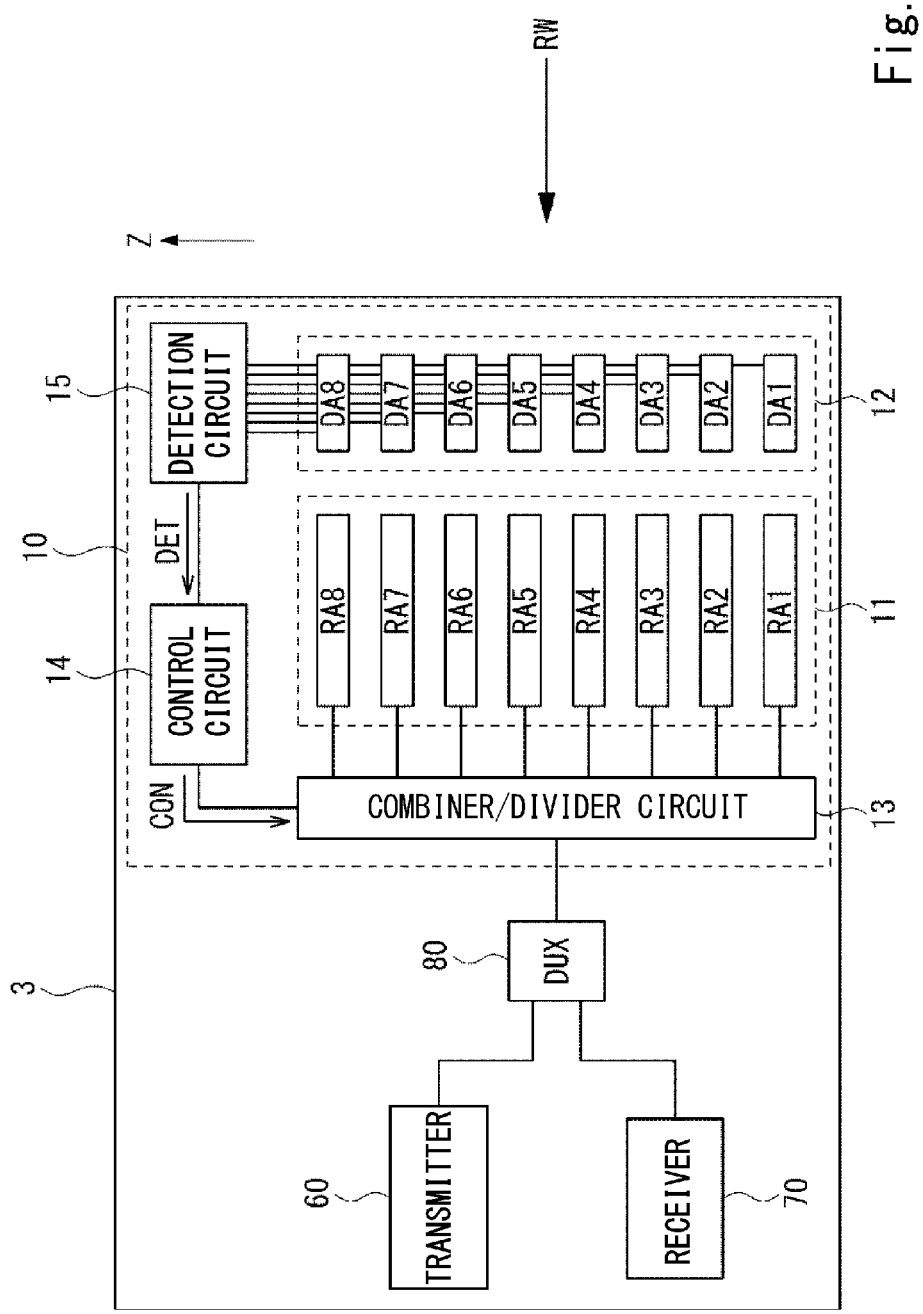
FIG. 9 schematically illustrates a configuration of a wireless communication apparatus according to a third example embodiment.

A wireless communication apparatus according to a third example embodiment will be described. FIG. 9 schematically illustrates a configuration of a wireless communication apparatus 3 according to the third example embodiment. The wireless communication apparatus 3 has a configuration in which a receiver 70 and a duplexer 80 are added to the wireless communication apparatus 1 according to the first example embodiment.

A signal output from the transmitter 60 is input to the antenna system 10 through the duplexer 80. The signal input to the antenna system 10 is transmitted to the air from the radiation antenna array 11. In the present configuration, a signal transmitted from another wireless communication apparatus is received by using the radiation antenna array 11. The received signal is input to the receiver 70 through the duplexer 80.

In the present configuration, the radiation antenna can be used for not only transmission but also reception by arranging between the transmitter and the receiver, and the radiation antenna array. Therefore, the number of the antennas can be reduced as compared with a configuration in which a dedicated reception antenna receiving a signal transmitted from the other wireless communication apparatus is disposed separately from the radiation antenna array and the detection antenna array.

In general, since the antenna requires a predetermined area for receiving the radio wave, an increase in the number of the antennas leads to an increase in a size of the wireless communication apparatus. In contrast, according to the present configuration, since the radiation antenna array can be used for both the transmission and reception, there is no need to separately provide the dedicated receiving antenna as described above. Therefore, the wireless communication system can be miniaturized.

Fourth Example Embodiment

Figure 10:
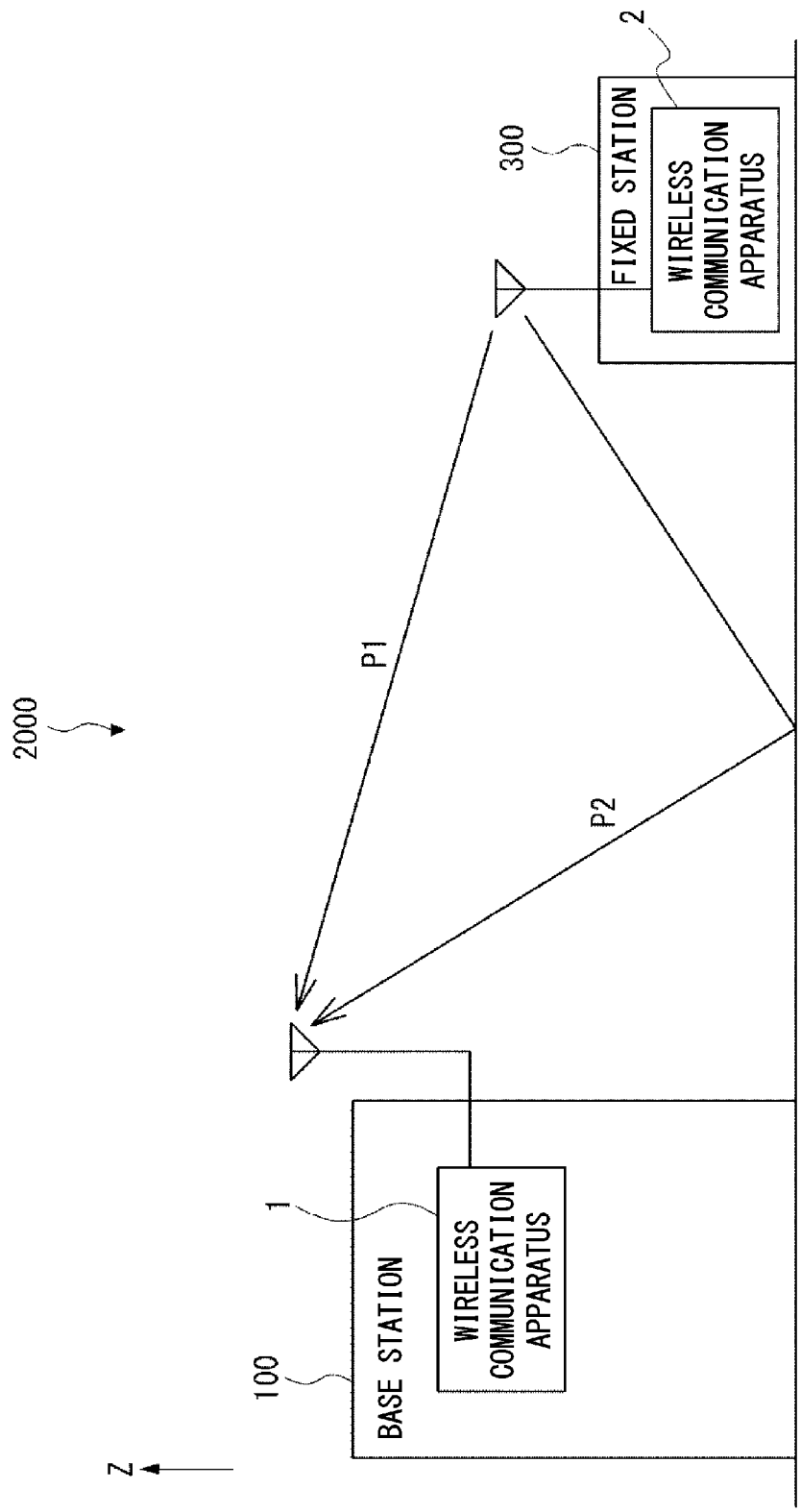
FIG. 10 schematically illustrates a wireless communication system according to a fourth example embodiment.

A wireless communication system according to a fourth example embodiment will be described. FIG. 10 schematically illustrates a wireless communication system 2000 according to the fourth example embodiment. In the wireless communication system 2000, the wireless communication apparatus 2 that is the communication partner of the wireless communication apparatus 1 is disposed in a fixed station 300. In this case, the positional relation of the wireless communication apparatus 1 in the base station 100 and the wireless communication apparatus 2 of the fixed station 300 does not vary.

Figure 11:
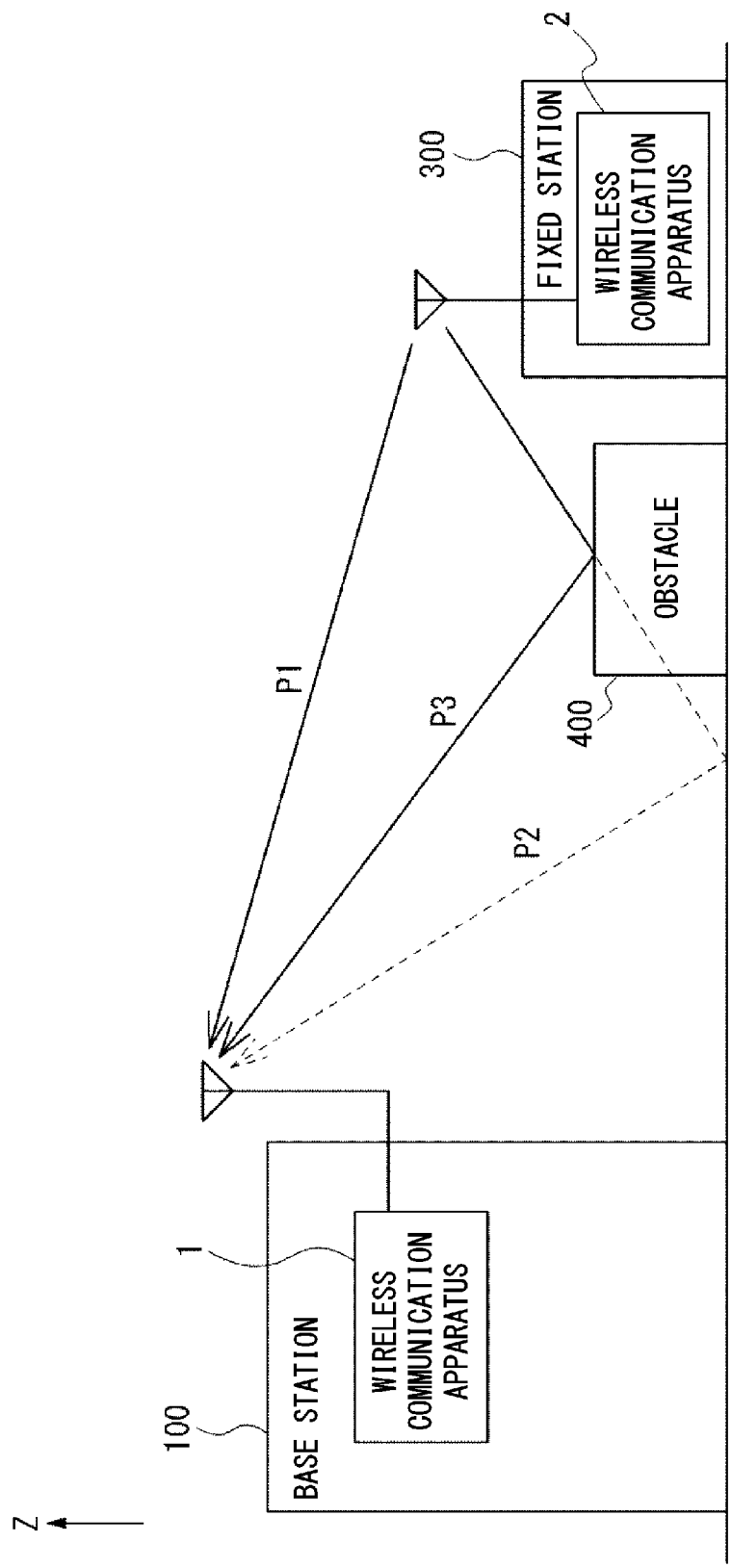
FIG. 11 illustrates a propagation path of a radio wave due to an obstacle in the wireless communication system.

However, when the base station 100 and the fixed station 300 are disposed in the urban area, an obstacle such as a vehicle may interpose between the base station 100 and the fixed station 300. FIG. 11 illustrates a propagation path of the radio wave due to the obstacle in the wireless communication system 2000. As illustrated in FIG. 11, when an obstacle 400 interposes between the base station 100 and the fixed station 300, a path P3 in which the radio wave radiated from the wireless communication apparatus 2 reaches the wireless communication apparatus 1 after reflected by the obstacle 400 appears. Since the reception state of the wireless communication apparatus 1 varies due to the radio wave reaching the wireless communication apparatus 2 through the newly appeared path P3, the height pattern varies.

However, as described in the first to third example embodiment, the wireless communication apparatus 1 can select the radiation antenna based on the reception sensitivity of the detection antennas DA1 to DA8. Therefore, even when the radio wave propagation circumstance varies due to the obstacle, the communication quality can be maintained.

In other words, according to the first to fourth example embodiment, it is possible to maintain the communication quality by selecting the radiation antenna based on the result of monitoring the reception sensitivity of the detection antenna, regardless of whether the communication partner is moving or stationary.

Other Example Embodiments

The present invention is not limited to the above-described example embodiments, and can be modified as appropriate without departing from the scope of the invention. For example, although the present invention has been described as hardware in the example embodiments described above, the present invention is not limited to this. In the present invention, the operation in which the control circuit 14 selects the radiation antenna used for radiating the radio wave based on the reception sensitivity of the detection antennas DA1 to DA8 can be also achieved by causing the CPU (Central Processing Unit) to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

Figure 12:
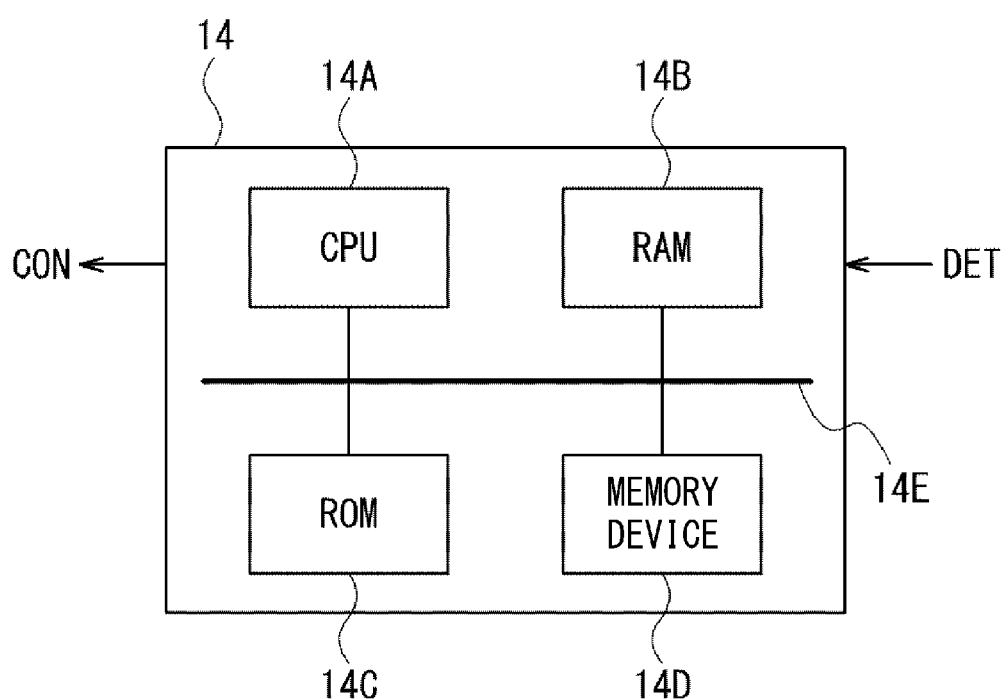
FIG. 12 illustrates an example of a control circuit.
Figure 13:
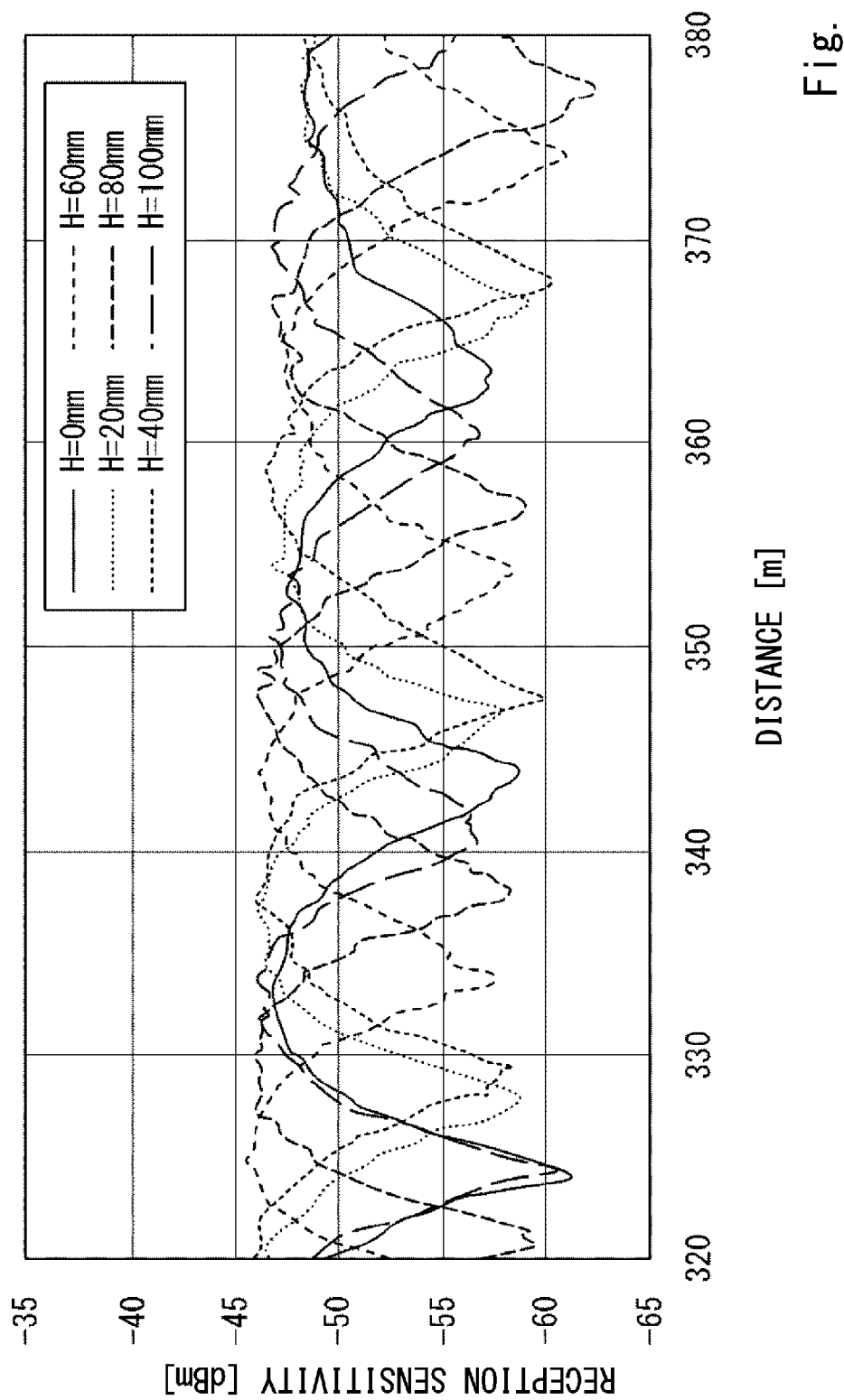
FIG. 13 illustrates a relation (Height pattern) between a distance between two wireless communication apparatuses and a height of a reception antenna of the wireless communication apparatus.

In this case, the control circuit 14 is configured as a control unit including a processing device such as a CPU and peripheral devices thereof. FIG. 12 illustrates an example of the control unit. The control unit 14 in FIG. 12 includes a CPU 14A, a RAM (Random Access Memory) 14B, a ROM (Read Only Memory) 14C, a memory device 14D, and a bus 14E. Data and commands can be communicated in the CPU 14A, the RAM 14B, the ROM 14C, and the memory device 14D through the bus 14E. The program described above is stored, for example, in the ROM 14C, and the CPU 14A appropriately loads the program from the ROM 14C and executes it. The data corresponding to the detection signal DET output from the detection circuit 15 is stored, for example, in the RAM 14B.

The CPU 14A loads the data stored in the RAM 14B when acquiring the reception sensitivity distribution. The CPU 14A may also write the acquired information such as the reception sensitivity distribution in the memory device 15D. Various types of tangible recording medium can be used as the memory device 15D.

Although the example in which the detection antenna array includes the eight detection antennas has been described in the example embodiments described above, it is merely an example. That is, the detection antenna array may be configured to include a plurality of detection antennas other than eight.

Although the example in which the radiation antenna array includes the eight radiation antennas has been described in the example embodiments described above, it is merely an example. That is, the radiation antenna array may be configured to include a plurality of radiation antennas other than eight.

Although the configuration and operation of the wireless communication apparatus 1 have been described in the example embodiments described above, the wireless communication apparatus 2 may also have the same configuration as the wireless communication apparatus 1 and operates in the same manner as the wireless communication apparatus 1. When the wireless communication system includes a plurality of the wireless communication apparatuses, a part or all the wireless communication apparatuses may be the wireless communication apparatuses including the antenna system according to the example embodiments described above.

While the present invention has been described above with reference to example embodiments, the present invention is not limited to the example embodiments stated above.

(Supplementary Note 1) An antenna system including: a plurality of radiation antennas configured to radiate radio waves, the radiation antennas being arranged in a first direction and; a plurality of radiation antennas arranged in a first direction, each radiation antenna being configured to radiate a radio wave; a plurality of detection antennas arranged in the first direction to respectively correspond to the radiation antennas, each detection antenna being configured to receive a radio wave; a detection unit configured to detect reception sensitivity distribution of the detection antennas in the first direction; and a control unit configured to control the combiner/divider unit based on the reception sensitivity distribution to cause the radiation antennas corresponding to the detection antenna having reception sensitivity higher than a predetermined value to radiate the radio wave.

(Supplementary Note 2) The antenna system according to Supplementary Note 1, in which the detection antennas are arranged separately from the radiation antennas in a direction orthogonal to the first direction.

(Supplementary Note 3) The antenna system according to Supplementary Note 1 or 2, in which the control unit controls the combiner/divider unit in such a manner that the radio wave is radiated from a first radiation antenna corresponding to the detection antenna having the reception sensitivity higher than the predetermined value, from one or more second radiation antennas arranged in the first direction with respect to the first radiation antenna, and from one or more third radiation antennas arranged in a second direction opposite to the first direction with respect to the first radiation antenna.

(Supplementary Note 4) The antenna system according to Supplementary Note 1, in which the control unit controls the combiner/divider unit in such a manner that the radio wave is radiated from the radiation antenna corresponding to the detection antenna the reception sensitivity of which is the maximum in the detection antennas having the reception sensitivity higher than the predetermined value.

(Supplementary Note 5) The antenna system according to Supplementary Note 4, in which the control unit controls the combiner/divider unit in such a manner that the radio waves are radiated, in the detection antennas having the reception sensitivity higher than the predetermined value, from a fourth radiation antenna corresponding to the detection antenna having the maximum reception sensitivity, from one or more fifth radiation antennas arranged in the first direction with respect to the fourth radiation antenna, and from one or more sixth radiation antennas arranged in a second direction opposite to the first direction with respect to the fourth radiation antenna.

(Supplementary Note 6) The antenna system according to Supplementary Note 3 or 5, in which the control unit detects a peak width of the reception sensitivity distribution and determines the number of the radiation antennas radiating the radio wave based on the peak width.

(Supplementary Note 7) The antenna system according to any one of Supplementary Notes 1 to 6, in which the combiner/divider unit includes: a switching unit configured to connect between a terminal to which the transmission signal is input and the radiation antennas; and a switching control unit configured to connect the radiation antenna radiating the radio wave in the radiation antennas with the terminal to which the transmission signal is input.

(Supplementary Note 8) An antenna system including: a plurality of radiation antennas configured to radiate radio waves, the radiation antennas being arranged in a first direction and; a plurality of radiation antennas arranged in a first direction, each radiation antenna being configured to radiate a radio wave; a plurality of detection antennas arranged in the first direction to respectively correspond to the radiation antennas, each detection antenna being configured to receive a radio wave; a detection unit configured to detect reception sensitivity distribution of the detection antennas in the first direction; a control unit controls the combiner/divider unit based on the reception sensitivity distribution to cause the radiation antennas corresponding to the detection antenna having reception sensitivity higher than a predetermined value to radiate the radio wave; and a plurality of dividers, in which one radiation antenna and one detection antenna corresponding to the one radiation antenna are configured as one antenna, the dividers are inserted between the antennas and the combiner/divider unit, respectively, and the divider passes the transmission signal output from the combiner/divider unit to the antennas and passes a signal generated by receiving the radio wave by the antenna to the detection unit.

(Supplementary Note 9) A wireless communication apparatus including: a transmitter configured to transmit a transmission signal; and an antenna system configured to radiate a radio wave in response to the transmission signal, in which the antenna system includes: a plurality of radiation antennas arranged in a first direction, each radiation antenna being configured to radiate a radio wave; a plurality of detection antennas arranged in the first direction to respectively correspond to the radiation antennas, each detection antenna being configured to receive a radio wave; the detection antennas being arranged in the first direction to correspond to the radiation antennas, respectively; a combiner/divider unit configured to distribute the input transmission signal to the radiation antennas; a detection unit configured to detect reception sensitivity distribution of the detection antennas in the first direction; and a control unit configured to control the combiner/divider unit based on the reception sensitivity distribution to cause the radiation antennas corresponding to the detection antenna having reception sensitivity higher than a predetermined value to radiate the radio wave.

(Supplementary Note 10) A wireless communication system comprising a plurality of wireless communication apparatus, in which a part or all of the wireless communication apparatus includes: a transmitter configured to transmit a transmission signal; and an antenna system configured to radiate a radio wave in response to the transmission signal, in which the antenna system includes: a plurality of radiation antennas arranged in a first direction, each radiation antenna being configured to radiate a radio wave; a plurality of detection antennas arranged in the first direction to respectively correspond to the radiation antennas, each detection antenna being configured to receive a radio wave; a combiner/divider unit configured to distribute the input transmission signal to the radiation antennas; a detection unit configured to detect reception sensitivity distribution of the detection antennas in the first direction; and a control unit configured to control the combiner/divider unit based on the reception sensitivity distribution to cause the radiation antennas corresponding to the detection antenna having reception sensitivity higher than a predetermined value to radiate the radio wave.

(Supplementary Note 11) A control method of an antenna system including: detecting reception sensitivity of radio waves received by a plurality of detection antennas arranged in a first direction to correspond to a plurality of radiation antennas configured to radiate radio waves in response to a transmission signal, respectively; and controlling a combiner/divider unit distributing the transmission signal to the radiation signal based on the reception sensitivity distribution to cause the radiation antennas corresponding to the detection antenna having reception sensitivity higher than a predetermined value to radiate the radio waves.

(Supplementary Note 12) A control program of an antenna system, the control program causing to a computer to execute processes of: detecting reception sensitivity of radio waves received by a plurality of detection antennas arranged in a first direction to correspond to a plurality of radiation antennas configured to radiate radio waves in response to a transmission signal, respectively; and controlling a combiner/divider unit distributing the transmission signal to the radiation signal based on the reception sensitivity distribution to cause the radiation antennas corresponding to the detection antenna having reception sensitivity higher than a predetermined value to radiate the radio waves.

The present invention has been described above with reference to the example embodiments, but the present invention is not limited to the above example embodiments. The configuration and details of the present invention can be modified in various ways which can be understood by those skilled in the art within the scope of the invention.

REFERENCE SIGNS LIST

1 TO 3 WIRELESS COMMUNICATION APPARATUSES
10, 20 ANTENNA SYSTEMS
11 RADIATION ANTENNA ARRAY
12 DETECTION ANTENNA ARRAY
13 COMBINER/DIVIDER CIRCUIT
13A SWITCHING CONTROL CIRCUIT
13B SWITCHING CIRCUIT
14 CONTROL CIRCUIT
14A CPU
14B RAM
14C ROM
14D MEMORY DEVICE
14E BUS
15 DETECTION CIRCUIT
15A DETECTION CIRCUIT
15B SWITCHING CIRCUIT
21 ANTENNA ARRAY
60 TRANSMITTER
70 RECEIVER
80 DUPLEXER
100 BASE STATION
200 VEHICLE
300 FIXED STATION
400 OBSTACLE
1000, 2000 WIRELESS COMMUNICATION SYSTEMS
A1 TO A8 ANTENNAS
AE ANTENNA ELEMENTS
CON CONTROL SIGNAL
DA1 TO DA8 DETECTION ANTENNAS
DET DETECTION SIGNAL
DIS1 TO DIS8 DIVIDERS
RA1 TO RA8 RADIATION ANTENNAS
S1 TO S8 SWITCHES
SW1 TO SW8 SWITCHES

The invention claimed is:

1. An antenna system comprising:
a plurality of radiation antennas arranged in a first direction, each radiation antenna being configured to radiate a radio wave;
a plurality of detection antennas arranged in the first direction to respectively correspond to the radiation antennas, each detection antenna being configured to receive a radio wave;
a combiner/divider unit configured to distribute an input transmission signal to the radiation antennas;
a detection unit configured to detect reception sensitivity distribution of the detection antennas in the first direction; and
a control unit configured to control the combiner/divider unit based on the reception sensitivity distribution to cause the radiation antenna corresponding to the detection antenna having reception sensitivity higher than a predetermined value to radiate the radio wave.

2. The antenna system according to claim 1, wherein the detection antennas are arranged separately from the radiation antennas in a direction orthogonal to the first direction.

3. The antenna system according to claim 1, wherein the control unit controls the combiner/divider unit in such a manner that the radio wave is radiated from a first radiation antenna corresponding to the detection antenna having the reception sensitivity higher than the predetermined value, from one or more second radiation antennas arranged in the first direction with respect to the first radiation antenna, and from one or more third radiation antennas arranged in a second direction opposite to the first direction with respect to the first radiation antenna.

4. The antenna system according to claim 1, wherein the control unit controls the combiner/divider unit in such a manner that the radio wave is radiated from the radiation antenna corresponding to the detection antenna the reception sensitivity of which is the maximum in the detection antennas having the reception sensitivity higher than the predetermined value.

5. The antenna system according to claim 4, wherein the control unit controls the combiner/divider unit in such a manner that the radio waves are radiated, in the detection antennas having the reception sensitivity higher than the predetermined value, from a fourth radiation antenna corresponding to the detection antenna having the maximum reception sensitivity, from one or more fifth radiation antennas arranged in the first direction with respect to the fourth radiation antenna, and from one or more sixth radiation antennas arranged in a second direction opposite to the first direction with respect to the fourth radiation antenna.

6. The antenna system according to claim 3, wherein the control unit detects a peak width of the reception sensitivity distribution and determines the number of the radiation antennas radiating the radio wave based on the peak width.

7. The antenna system according to claim 1, wherein
the combiner/divider unit comprises:
a switching unit configured to connect between a terminal to which the transmission signal is input and the radiation antennas; and
a switching control unit configured to connect the radiation antenna radiating the radio wave in the radiation antennas with the terminal to which the transmission signal is input.

8. An antenna system comprising:
a plurality of radiation antennas arranged in a first direction, each radiation antenna being configured to radiate a radio wave;
a plurality of detection antennas arranged in the first direction to respectively correspond to the radiation antennas, each detection antenna being configured to receive a radio wave;
a combiner/divider unit configured to distribute an input transmission signal to the radiation antennas;
a detection unit configured to detect reception sensitivity distribution of the detection antennas in the first direction; and
a control unit configured to control the combiner/divider unit based on the reception sensitivity distribution to cause the radiation antenna corresponding to the detection antenna having reception sensitivity higher than a predetermined value to radiate the radio wave; and
a plurality of dividers, wherein
one radiation antenna and one detection antenna corresponding to the one radiation antenna are configured as one antenna, the dividers are inserted between the antennas and the combiner/divider unit, respectively, and the divider passes the transmission signal output from the combiner/divider unit to the antennas and passes a signal generated by receiving the radio wave by the antenna to the detection unit.

9. A control method of an antenna system comprising:

detecting reception sensitivity of a radio wave received by a plurality of detection antennas arranged in a first direction to respectively correspond to a plurality of radiation antennas configured to radiate a radio wave in response to a transmission signal; and controlling a combiner/divider unit distributing the transmission signal to the radiation antennas based on the reception sensitivity distribution to cause the radiation antenna corresponding to the detection antenna having the reception sensitivity higher than a predetermined value to radiate the radio waves.

* * * * *